United States Patent
Kinzie et al.

(10) Patent No.: US 7,902,689 B2
(45) Date of Patent: Mar. 8, 2011

(54) METHOD AND SYSTEM FOR NOISE CONTROLLED OPERATION OF A WIND TURBINE

(75) Inventors: Kevin Kinzie, Moore, SC (US); Stefan Herr, Greenville, SC (US); Benoit Petitjean, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/498,761

(22) Filed: Jul. 7, 2009

(65) Prior Publication Data

US 2010/0133818 A1   Jun. 3, 2010

(51) Int. Cl.
   *F03D 9/00*   (2006.01)
   *H02P 9/04*   (2006.01)

(52) U.S. Cl. .......................................... 290/55; 290/44

(58) Field of Classification Search .............. 290/44, 290/55; 415/4.5, 4.2, 4.3, 2.1, 7, 119; 60/398; 416/1, 132 B; 700/287
See application file for complete search history.

(56) References Cited

U.S. PATENT DOCUMENTS

| | | | |
|---|---|---|---|
| 6,688,841 B1 * | 2/2004 | Wobben | 415/1 |
| 6,966,754 B2 | 11/2005 | Wobben | |
| 7,081,689 B2 * | 7/2006 | Tilscher et al. | 290/44 |
| 7,118,338 B2 | 10/2006 | Moroz et al. | |
| 7,275,912 B2 | 10/2007 | Steudel | |
| 7,352,075 B2 | 4/2008 | Willey et al. | |
| 7,420,289 B2 | 9/2008 | Wang et al. | |
| 7,437,264 B2 | 10/2008 | Pierce et al. | |
| 2007/0018457 A1 * | 1/2007 | Llorente Gonzalez | 290/44 |
| 2007/0025858 A1 * | 2/2007 | Driver et al. | 416/229 R |
| 2007/0031237 A1 | 2/2007 | Bonnet | |
| 2007/0085343 A1 | 4/2007 | Fortmann | |
| 2008/0086281 A1 | 4/2008 | Santos | |
| 2008/0136188 A1 | 6/2008 | Krueger | |
| 2008/0206055 A1 * | 8/2008 | Godsk et al. | 416/147 |
| 2009/0169378 A1 * | 7/2009 | Menke | 416/1 |
| 2009/0311097 A1 * | 12/2009 | Pierce et al. | 416/42 |
| 2010/0074748 A1 * | 3/2010 | Godsk et al. | 416/1 |

FOREIGN PATENT DOCUMENTS

EP    2000665 A2    10/2008
JP    2004293527 A  * 10/2004

* cited by examiner

*Primary Examiner* — Julio Gonzalez
(74) *Attorney, Agent, or Firm* — McNees Wallace & Nurick LLC

(57) ABSTRACT

A method for controlling noise generated from a wind turbine. The method including providing a blade attached to a hub having a rotor shaft, and a generator in communication with the rotor shaft. The at least one blade includes an adjustable pitch angle. The method further includes providing a wind turbine acoustical profile and a wind turbine power profile. The wind turbine acoustical profile and the wind turbine power profile are compared to determine a noise reduced operational condition. The wind turbine is controlled to provide a rotor speed and the pitch angle of the blade corresponding to the noise reduced operational condition.

20 Claims, 6 Drawing Sheets

METHOD AND SYSTEM FOR NOISE CONTROLLED OPERATION OF A WIND TURBINE

FIELD

The present disclosure is directed to a method and system for the control of noise emissions in wind turbines. In particular, the present disclosure is directed to a method and system for controlling noise emission of a wind turbine and maintaining a desired power coefficient.

BACKGROUND

Wind energy systems have gained more and more importance as a source of energy in recent years. As areas suitable for their economical operation are relatively scarce in a number of countries, a growing number of wind energy systems are located close to populated areas. As the operation of wind turbines in wind energy systems results in noise emissions, this leads to various problems such as resistance from neighborhoods and the like. A variety of factors contribute to the overall noise emission of such systems such as tonal noise emissions and aerodynamic noise emissions. In certain locations and regions, local ordinances or other regulations limit the allowable emission of noise.

During normal operation, wind turbines with sophisticated control systems maintain constant speed and power by active blade pitch control. In addition, wind turbines have a controller which adjusts the pitch angle of the blade to optimize energy captured below rated winds and regulates power above rated winds. The controller may utilize a fixed fine pitch angle in the variable speed region and adjust the pitch in above rated wind speed depending on the power output and rotational speed of the turbine.

Methods for reducing the noise emissions of wind energy systems have long been discussed. For example, it has been proposed to reduce aerodynamic noise caused by the blades through a speed/torque control of the system in order to keep turbine speed low during certain time intervals, e.g., during night time or other times in which reduced noise is desired. Such derating greatly reduces the power production. Another proposed method to reduce noise emission is to reduce rotor rotational speed of certain wind turbines in a wind park individually, also referred to as "derating" the wind turbine, in order to gain maximum overall performance of the system while meeting park noise constraints. Such selective derating of individual turbines permits a number of wind turbines to run at significantly higher speeds than the average speed of all the remaining turbines. This proposed solution provides greater power capture than a complete derating of the park, but provides reduced noise control and operation at reduced power coefficients.

It would be beneficial to provide a method and system in which the turbine can be controlled to extract a maximum or near maximum amount of power from the wind at a controlled noise level.

SUMMARY

One aspect of the present disclosure includes a method for controlling noise generated from a wind turbine. The method includes providing a blade attached to a hub having a rotor shaft and a generator in communication with the rotor shaft. The blade or blades include(s) an adjustable pitch angle. The method further includes providing a wind turbine acoustical profile and a wind turbine power profile. The wind turbine acoustical profile and the wind turbine power profile are compared to determine a noise reduced operational condition. The wind turbine is controlled to provide a rotor speed and a corresponding pitch angle of the blade to reduce the operational condition related noise.

Another aspect of the present disclosure is a wind turbine having at least one blade operably mounted on the wind turbine, at least one blade attached to a hub having a rotor shaft, and the rotor shaft in communication with a generator. At least one blade includes an adjustable pitch angle. The generator is configured for converting torque into electrical power. The wind turbine also includes a controller capable of comparing a wind turbine acoustical profile to a wind turbine power profile to determine a noise reduced operational condition. The controller is further capable of controlling the wind turbine to establish a rotor speed and the pitch angle of the blade corresponding to the noise reduced operational condition.

Still another aspect of the present disclosure includes a wind turbine plant including a plurality of wind turbines. At least one of the plurality of wind turbines includes at least one blade operably mounted on the wind turbine, at least one blade attached to a hub having a rotor shaft, and the rotor shaft in communication with a generator. At least one blade includes an adjustable pitch angle. The generator is configured for converting torque into electrical power. The wind turbine also includes a controller capable of comparing a wind turbine acoustical profile to a wind turbine power profile to determine a noise reduced operational condition. The controller is further capable of controlling the wind turbine to provide a rotor speed and the pitch angle of the blade corresponding to the noise reduced operational condition.

One advantage of the system and method of the present disclosure is that the noise generated by the wind turbine may be controlled to meet local ordinances or other noise limiting requirements.

Still another advantage of the system and method of the present disclosure is the increased control of the wind turbine, providing additional abilities for the wind turbine to quickly and efficiently meet both noise and power requirements.

Other features and advantages of the present disclosure will be apparent from the following more detailed description of the preferred embodiment, taken in conjunction with the accompanying drawings which illustrate, by way of example, the principles of the invention.

DETAILED DESCRIPTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy created by wind energy, and more specifically, converts mechanical energy converted from kinetic energy of wind to electrical power. As used herein, the term "windmill" is intended to be representative of any wind turbine that uses rotational energy generated from wind energy, and more specifically, mechanical energy converted from kinetic energy of wind, for a predetermined purpose other than generating electrical power, such as, but not limited to, pumping a fluid and/or grinding a substance.

Figure 1:
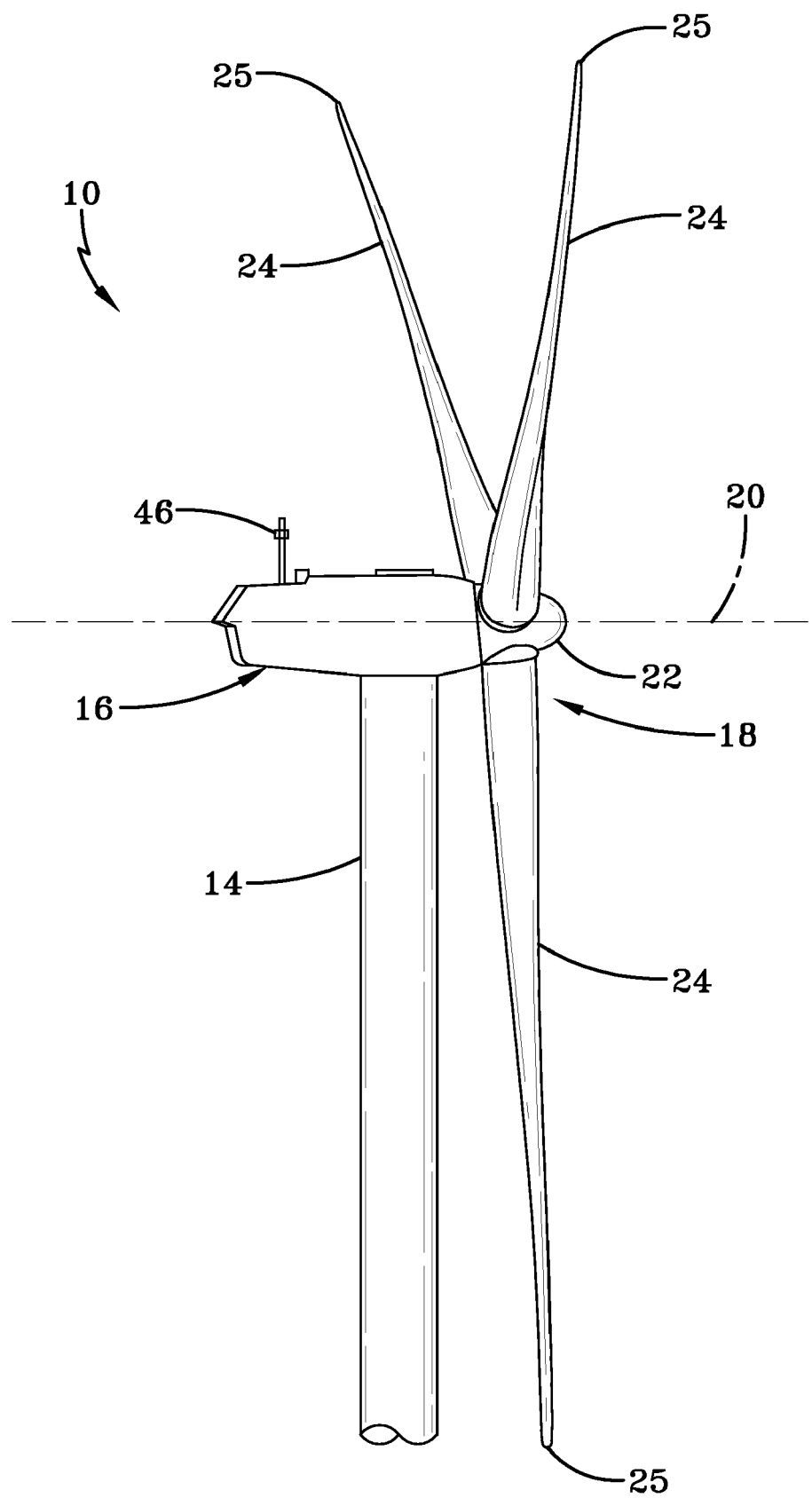
FIG. 1 is a perspective view of an exemplary wind turbine in accordance with an embodiment of the present disclosure.
Figure 2:
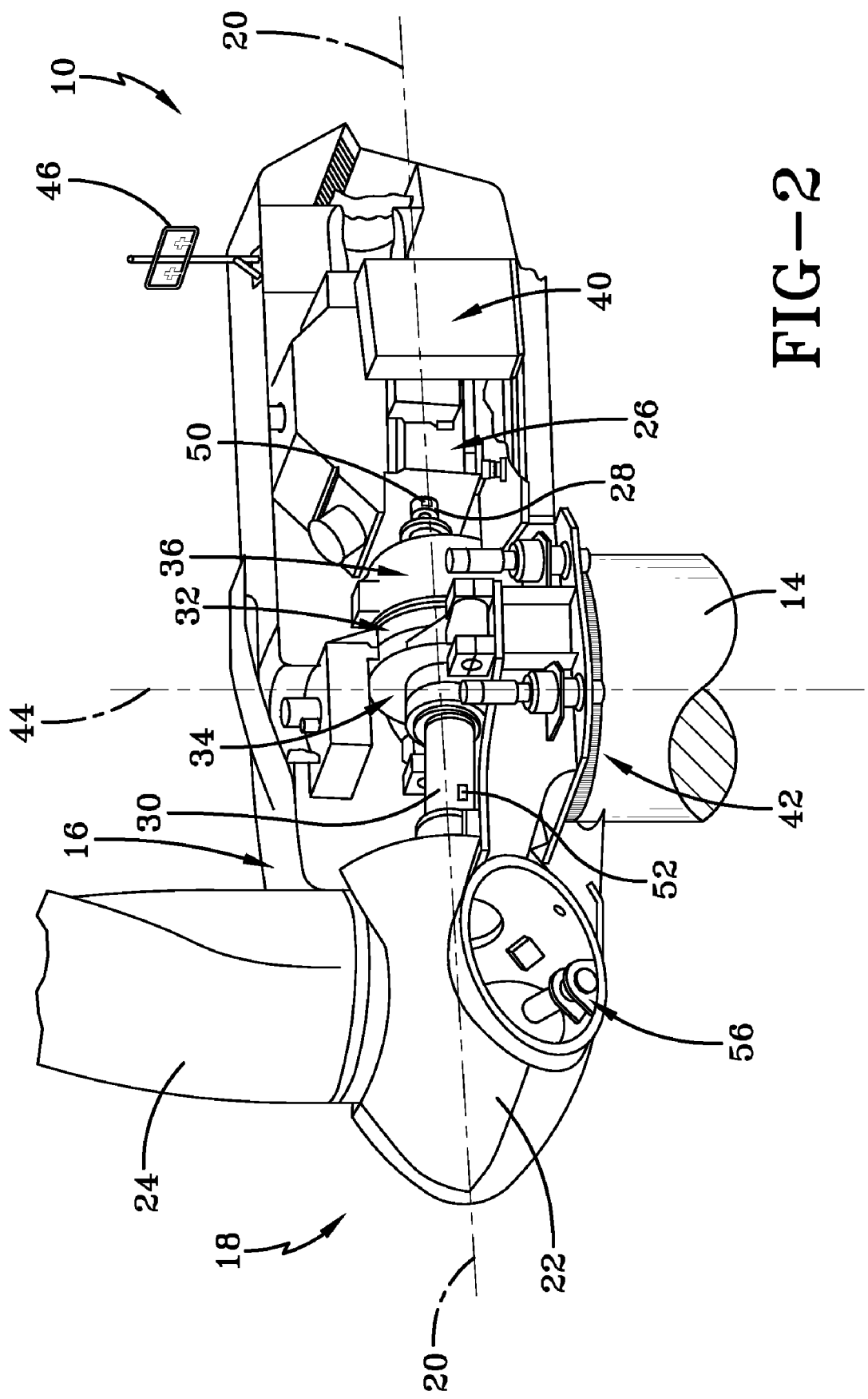
FIG. 2 is a partially cut-away perspective view of a portion of a wind turbine in accordance with an embodiment of the present disclosure.
Figure 3:
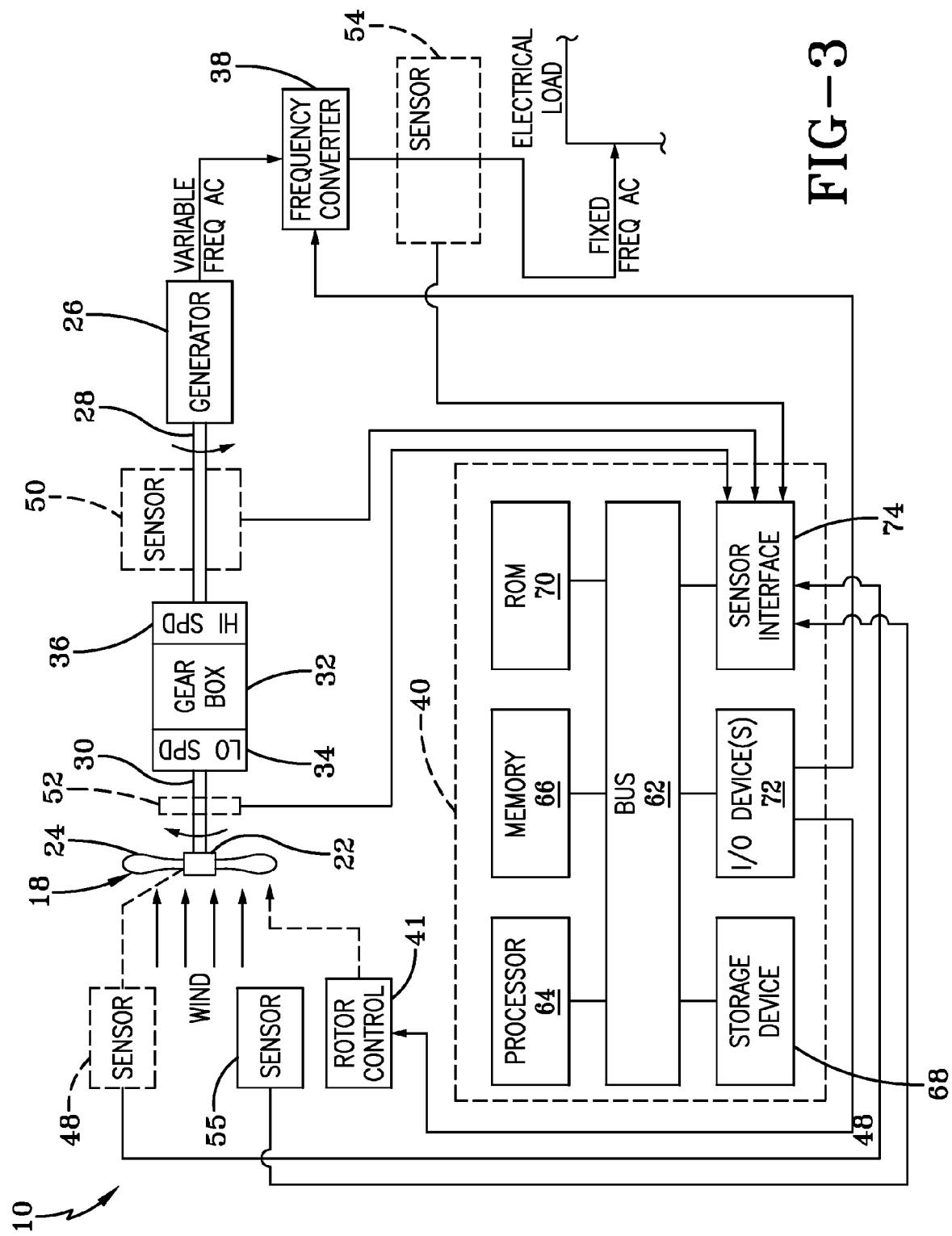
FIG. 3 is a schematic diagram of a wind turbine according to an embodiment of the present disclosure.

FIG. 1 is a perspective view of an exemplary wind turbine 10 in accordance with an embodiment of the present disclosure. FIG. 2 is a partially cut-away perspective view of a portion of wind turbine 10 in accordance with an embodiment of the present disclosure. FIG. 3 is a schematic diagram of wind turbine 10. Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown) for receiving electrical power therefrom to drive operation of wind turbine 10 and/or its associated components and/or for supplying electrical power generated by wind turbine 10 thereto. Although only one wind turbine 10 is shown in FIGS. 1-3, in some embodiments a plurality of wind turbines 10 may be grouped together, sometimes referred to as a "wind plant" or "wind farm".

Wind turbine 10 includes a nacelle 16 and a rotor (generally designated by 18) coupled to nacelle 16 for rotation with respect to nacelle 16 about an axis of rotation 20. In the exemplary embodiment, nacelle 16 is mounted on a tower 14. The height of tower 14 may be any suitable height enabling wind turbine 10 to function as described herein. Rotor 18 includes a hub 22 and a plurality of blades 24 (sometimes referred to as "airfoils") extending radially outward from hub 22 for converting wind energy into rotational energy. Each blade 24 has a tip 25 positioned at the end thereof which is distant from the hub 22. Although rotor 18 is described and illustrated herein as having three blades 24, rotor 18 may have any number of blades 24. Blades 24 may each have any length (whether or not described herein).

Despite how rotor blades 24 are illustrated in FIG. 1, rotor 18 may have blades 24 of any shape, and may have blades 24 of any type and/or any configuration, whether or not such shape, type, and/or configuration is described and/or illustrated herein. Another example of another type, shape, and/or configuration of rotor blades 24 is a darrieus wind turbine, sometimes referred to as an "eggbeater" turbine. Yet another example of another type, shape, and/or configuration of rotor blades 24 is a savonious wind turbine. Even another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in certain embodiments, rotor 18 may not face exactly upwind and/or downwind, but may face generally at any angle (which may be variable) with respect to a direction of the wind to harness energy therefrom.

Referring now to FIGS. 2 and 3, wind turbine 10 includes an electrical generator 26 coupled to rotor 18 for generating electrical power from the rotational energy generated by rotor 18. Generator 26 may be any suitable type of electrical generator, such as, but not limited to, a wound rotor induction generator. Generator 26 includes a stator (not shown) and a rotor (not shown). Rotor 18 includes a rotor shaft 30 coupled to rotor hub 22 for rotation therewith. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled to rotor shaft 30 such that rotation of rotor shaft 30 drives rotation of the generator rotor. In other embodiments, the generator rotor is directly coupled to rotor shaft 30, sometimes referred to as a "direct-drive wind turbine". In the exemplary embodiment, generator rotor shaft 28 is coupled to rotor shaft 28 through a gearbox 32, although in other embodiments generator rotor shaft 28 is coupled directly to rotor shaft 30. More specifically, in the exemplary embodiment, gearbox 32 has a low speed side 34 coupled to rotor shaft 30 and a high speed side 36 coupled to generator rotor shaft 28. The torque of rotor 18 drives the generator rotor to thereby generate variable frequency AC electrical power from rotation of rotor 18. Generator 26 has an air gap torque between the generator rotor and stator that opposes the torque of rotor 18. A frequency converter 38 is coupled to generator 26 for converting the variable frequency AC to a fixed frequency AC for delivery to an electrical load (not shown), such as, but not limited to, a power grid (not shown), coupled to generator 26. Frequency converter 38 may be located anywhere within or remote to wind turbine 10. For example, in the exemplary embodiment, frequency converter 38 is located within a base (not shown) of tower 14.

Wind turbine 10 includes one or more control systems 40 coupled to some or all of the components of wind turbine 10 for generally controlling operation of wind turbine 10 and/or some or all of the components thereof (whether or not such components are described and/or illustrated herein), and in particular for controlling the rotational speed of the rotor 18, including the tip speed of the blades 24 and the pitch angle of the blade 24. For example, in the exemplary embodiment, control system(s) 40 are coupled to a rotor control 41 for generally controlling rotor 18. In the exemplary embodiment, control system(s) 40 is mounted within nacelle 16. However, additionally or alternatively, one or more control systems 40 may be remote from nacelle 16 and/or other components of wind turbine 10. Control system(s) 40 may be used for, but is not limited to, noise level versus power generation monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind turbine 10 may include a disc brake or other braking mechanism (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44, for changing a yaw of rotor 18, and more specifically for changing the direction faced by rotor 18. It would be desirable to change the direction faced in order to adjust the angle between the direction faced by rotor 18 and the direction of wind. Yaw system 42 may be coupled to control system(s) 40 for control thereby. In some embodiments, wind turbine 10 may include anemometry 46 for measuring wind speed and/or wind direction. Anemometry 46, in some embodiments, may be coupled to control system(s) 40 for sending measurements to control system(s) 40 for processing thereof. For example, although anemometry 46 may be coupled to control system(s) 40 for sending measurements thereto for controlling other operations of wind turbine 10, anemometry 46 may send measurements to control system(s) 40 for controlling and/or changing the yaw of rotor 18 using yaw system 42. Alternatively, anemometry 46 may be coupled directly to yaw system 42 for controlling and/or changing the yaw of rotor 18.

Wind turbine 10 may also include a plurality of sensors 48 (FIG. 3), each coupled to a corresponding blade 24 for measuring a pitch of each blade 24, or more specifically an angle of each blade 24 with respect to a wind direction and/or with respect to rotor hub 22. Sensors 48 may be any suitable sensor having any suitable location within or remote to wind turbine 10, such as, but not limited to, optical encoders within pitch system 56 (described below). In some embodiments, sensors 48 are coupled to control system(s) 40 for sending pitch measurements to control system(s) 40 for processing thereof.

Wind turbines 10 may also include one or more sensors 50 coupled to generator rotor shaft 28 for measuring a speed of rotation of rotor shaft 28 and/or a torque of generator rotor shaft 28. Sensor(s) 50 may be any suitable sensor having any suitable location within or remote to wind turbine 10, such as, but not limited to, optical encoders, digital proximity sensors, strain gages, and/or tachometers. In some embodiments, sensor(s) 50 are coupled to control system(s) 40 for sending speed measurements to control system(s) 40 for processing thereof.

Wind turbines 10 may also include one or more sensors 52 coupled to rotor shaft 30 for measuring a speed of rotation of generator rotor shaft 28 and/or a torque of rotor shaft 30. Sensor(s) 52 may be any suitable sensor having any suitable location within or remote to wind turbine 10, such as, but not limited to, optical encoders, digital proximity sensors, piezoelectric transducers, strain gages, and/or tachometers. In some embodiments, sensor(s) 52 are coupled to control system(s) 40 for sending measurements to control system(s) 40 for processing thereof.

Wind turbines 10 may also include one or more sensors 54 (FIG. 3) coupled to generator 26 for measuring an electrical power output of generator 26. In some embodiments, sensor(s) 54 are coupled to control system(s) 40 for sending measurements to control system(s) 40 for processing thereof. Sensor(s) 54 may be any suitable sensor having any suitable location within or remote to wind turbine 10, such as, but not limited to, Hall effect current transducers (CTs) and/or capacitive voltage transducers (CVTs).

Wind turbines 10 may also include one or more sensors 55 (FIG. 3) coupled to control system(s) 40 for sending measurements to control system(s) 40 for processing thereof. Sensors 55 may be any suitable sensor having any suitable location within or remote to wind turbine 10, such as, but not limited to, anemometers.

Wind turbine 10 may also include one or more other sensors (not shown) coupled to one or more components of wind turbine 10 and/or the electrical load, whether or not such component(s) are described or illustrated herein, for measuring parameters of such component(s). Such other sensor(s) may include, but are not limited to, sensors configured to measure displacements, yaw, pitch, moments, strain, stress, twist, damage, failure, rotor torque, rotor speed, an anomaly in the electrical load, and/or an anomaly of power supplied to any component of wind turbine 10. Such other sensors may couple to any component of wind turbine 10 and/or the electrical load at any location thereof for measuring any parameter thereof, whether or not such component, location, and/or parameter is described and/or illustrated herein.

Wind turbine 10 includes a variable blade pitch system 56 for controlling, including but not limited to changing, a pitch angle of rotor blades 24 (shown in FIGS. 1-3) in response to a condition such as wind speed.

Referring again to FIG. 3, in some embodiments, control system(s) 40 include a bus 62 or other communications device to communicate information. One or more processor(s) 64 are coupled to bus 62 to process information, including information from anemometry 46, sensors 48, 50, 52, 54 and/or 55, and/or other sensor(s). Control system(s) 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. Control system(s) 40 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to control system(s) 40 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless, providing access to one or more electronically-accessible media, etc. In some embodiments, hard-wired circuitry can be used in place of or in combination with software instructions. Thus, execution of sequences of instructions is not limited to any specific combination of hardware circuitry and/or software instructions, whether described and/or illustrated herein. Control system(s) 40 may also include a sensor interface 74 that allows control system(s) 40 to communicate with anemometry 46, sensors 48, 50, 52, 54 and/or 55, and/or other sensor(s). Sensor interface 74 can be or can include, for example, one or more analog-to-digital converters that convert analog signals into digital signals that can be used by processor(s) 64.

The system and method according to the present disclosure includes the utilization of an acoustical profile and a power profile which control system(s) 40 to determine the rotor speed (i.e., the rotational speed at which the rotor 18 rotates typically measured in rotations per minute (rpm)) and/or the pitch angle (i.e., the angle at which the blade 24 is oriented about an axis extending from the hub 22) for use during noise reduced operation.

Figure 4:
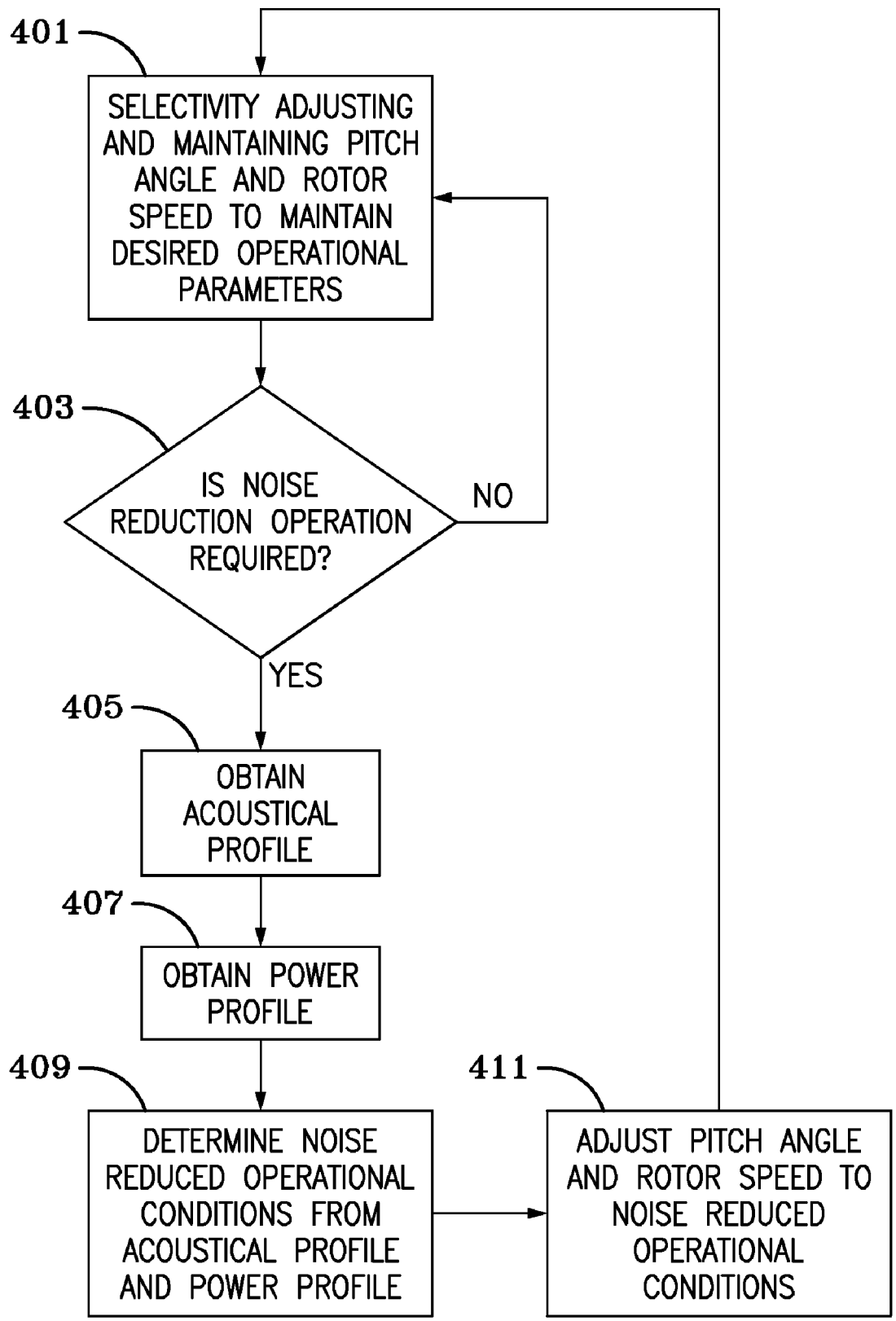
FIG. 4 is a flowchart illustrating an exemplary embodiment of a method for controlling a rotor speed of a wind turbine.

As shown in FIG. 4, the method includes selectively adjusting and maintaining the pitch angle and rotor speed to maintain desired operational parameters, step 401. The desired operational parameters in normal operation may be determined according to any parameters known for operating a wind turbine. For example the normal operation may be utilized to maximize or nearly maximize power coefficient for a given tip speed ratio. In noise reduced operation according to the present disclosure, the pitch angle and rotor speed are maintained and adjusted to achieve the noise reduced operational targets.

Figure 5:
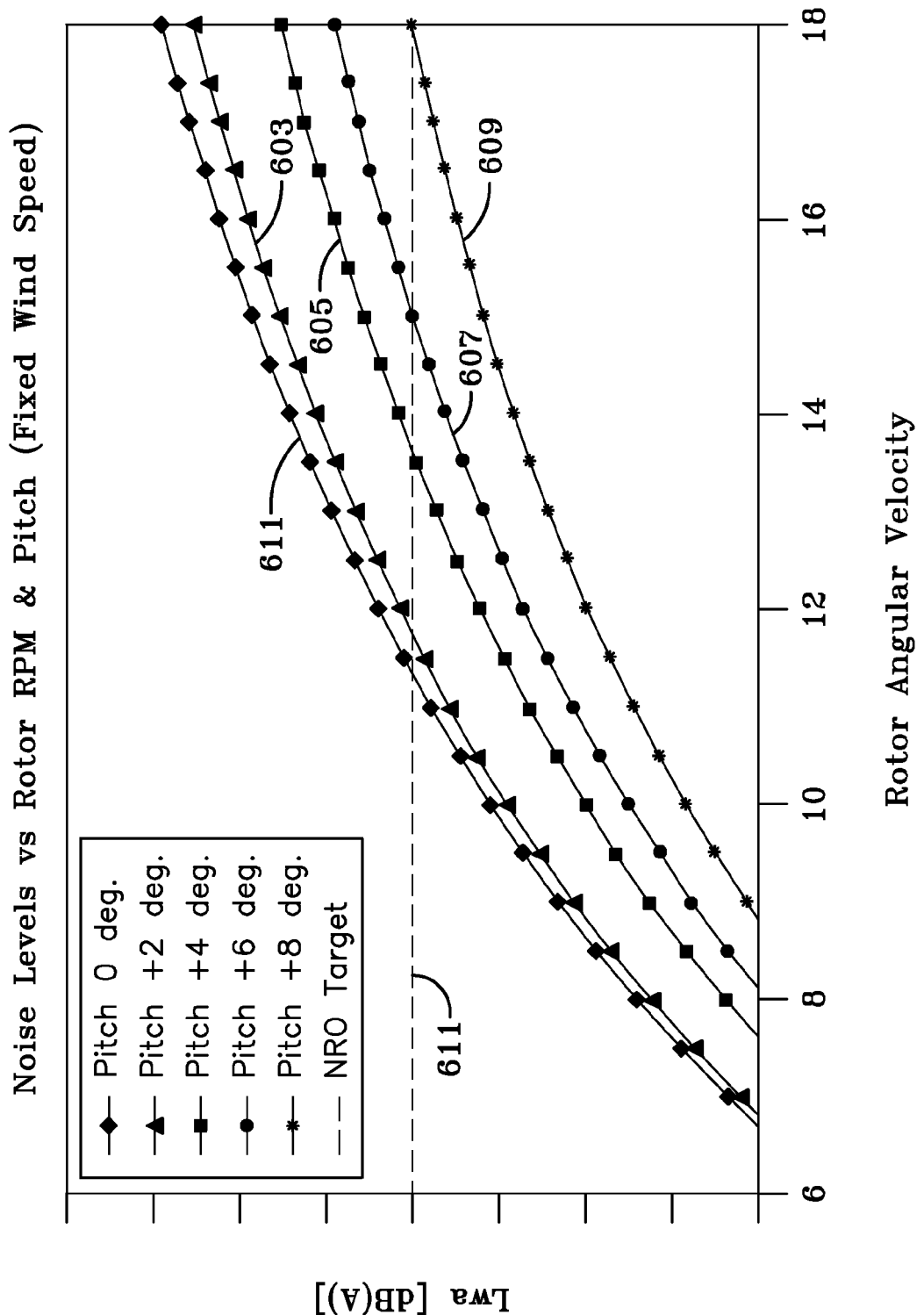
FIG. 5 is a graph illustrating noise level vs. rotor angular velocity for various pitch angles of a wind turbine according to an embodiment of the present disclosure.

The method further includes a determination of whether a noise reduced operation is required, step 403. The determination may be made manually, for example as an input from a user or central control, or may be automatic based upon measured or predicted conditions of the wind turbine or external conditions. If no noise reduced operation is required (i.e. "No" as shown in FIG. 4), the controller returns to step 401. However, if noise reduced operation is required (i.e. "Yes" as shown in FIG. 4), the method continues and an acoustical profile is obtained 405. The acoustical profile includes values for noise level for a range of rotor angular velocities and pitch angles. For example, a family of pitch angle curves vs. rotor angular velocity may be generated for each wind speed. The values for the noise level may be directly measured, predicted based on historical information or analytical models, or estimated based upon other sensor inputs. In one embodiment the acoustical profile points, such as the point shown in FIG. 5, are defined based on rotor angular velocity, pitch angle, and noise for each wind speed. Other embodiments may, alternately, define the acoustical profile based on pitch angle and tip speed ratio for each rotor speed. Other embodiments based on similar combinations of turbine operating parameters and noise are possible and may be directly measured, predicted based on historical information or analytical models, or estimated based upon other sensor inputs. The acoustical profile will be dependent upon a variety of factors, including, but not limited to the blade design, configuration of the wind turbine, the terrain surrounding the wind turbine, and the atmospheric conditions (e.g., density of the air). FIG. 5 shows merely an exemplary point within an acoustical profile, wherein the acoustical profile will include a plurality of plots of noise level versus rotor angular velocity or other parameter for various wind speeds. As shown, projected noise level is plotted versus rotor angular velocity with constant wind speed. A first set of points 601 includes points for a pitch angle of zero degrees. A second set of points 603 includes points for a pitch angle of +2 degrees. A third set of points 605 includes points for a pitch angle of +4 degrees. A fourth set of points 607 includes points for a pitch angle of +6 degrees. A fifth set of points 609 includes points for a pitch angle of +8 degrees. The specific pitch angles are illustrations and are not intended to limit the pitch angles that may be selectively adjusted. Further, the number of pitch angles represented at each rotor speed in the acoustical profile are not limited to five and may include any number of pitch angle relationships which may be presented in the acoustical profile. As rotor angular velocity increases, the noise generated generally increases. As discussed above, FIG. 5 represents a single point within the acoustical profile corresponding to a single wind speed. The acoustical profile according to the present disclosure includes a plurality of pitch angles to noise relationships for rotor angular velocities throughout the wind turbine operational range. As such, the control system 40 may determine a pitch angle that corresponds to a maximum or desired noise level as well as a range of tip speed ratios or rotor speeds that correspond with the maximum or desired noise level. As shown in FIG. 5, the NRO Target 611 represents an exemplary noise reduced operation target. The NRO Target 611 passes through the sets of points 601, 603, 605, 607, 609 at the point where the pitch angle provides the desired noise level for the corresponding rotor angular velocity. To determine the noise reduced operational conditions for the wind turbine the acoustical profile is compared to a power profile.

Figure 6:
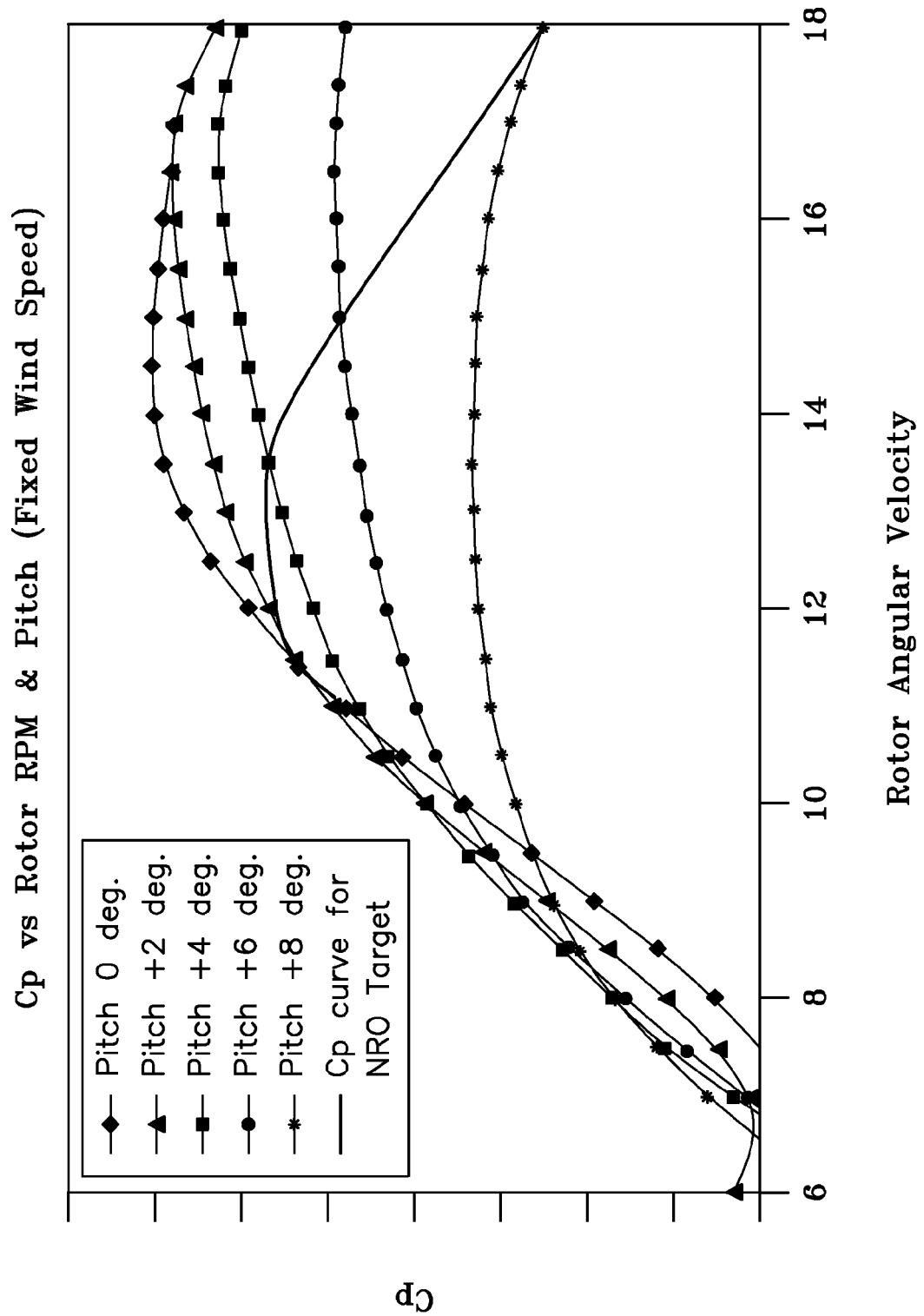
FIG. 6 is a graph illustrating power coefficient vs. rotor angular velocity for various pitch angles of a wind turbine according to an embodiment of the present disclosure.

The method shown in FIG. 4 further includes obtaining a power profile, step 407. The power profile is a relationship of operational conditions within the wind turbine, such as pitch angle in relation to power coefficient. An exemplary power profile may include values for power coefficient at various pitch angels over a range of tip speed ratios. Determination of power coefficients for the operational parameters can be accomplished by any known method and/or may be predicted from historical data. FIG. 6 shows an exemplary power profile. As shown, the graph includes a value for power coefficient ($C_p$) corresponding to five sets of values for pitch angle (i.e. Pitch Angle 0 degrees curve 701, Pitch Angle+2 degrees curve 703, Pitch Angle+4 degrees curve 705, Pitch Angle+6 degrees curve 707, and Pitch Angle+8 degrees curve 709). Each of the Pitch Angle curves 701, 702, 703, 705, 707, 709 corresponds to a $C_p$ for values of rotor angular velocity. The power coefficient is defined as the power extracted by the rotor divided by the amount of power in the wind. It is a measure of how efficiently the blade extracts power from the wind.

Once the acoustical profile and power profile are obtained, noise reduced operational conditions are determined from the acoustical profile and power profile for the required noise level, step 409. Operational conditions as discussed herein correspond to a combination of operational parameters, such as rotor speed and pitch angle. For example, the control system 40 compares the power profile to the acoustical profile to determine the noise reduced operational conditions, including the rotor speed, for example, as calculated from the rotor angular velocity, and the pitch angle that corresponds to the maximum or near maximum $C_p$ which also permits operation below the maximum noise or at the desired noise level as determined by the acoustical profile. While the above has been described as providing a maximum or near maximum $C_p$ for the required noise level, any desired $C_p$ may be used to determine the noise reduced operational conditions. As shown in FIG. 6, the $C_p$ curve for NRO Target 711 represents values for $C_p$ corresponding to values of rotor angular velocity and pitch angle adjusted for noise reduced operation. In other words, the power profile shown illustrated in FIG. 6 provides the operational parameters, including rotor speed and pitch angle for a particular wind speed. As with the acoustical profile, the power profile is shown at merely a single wind speed. The power profile includes a relationship for a plurality of wind speeds throughout the operational range of wind speeds, such that the noise reduced operational conditions may be determined at various encountered wind speeds during operation.

Thereafter, the pitch angle and rotor speed are adjusted to the noise reduced operational conditions, step 411. For example the adjusting of pitch angle and rotor speed can be accomplished by providing signals from the controller to the individual system of the wind turbine 10 which controls the pitch angle and rotor speed.

The herein-described and/or illustrated embodiments are cost-effective and efficient for controlling rotor speed. More specifically, by controlling generator rotor shaft torque to control rotor speed and alternating between changing and maintaining blade pitch angle, the embodiments described and/or illustrated herein may facilitate reducing an amount of pitch movement required to control rotor speed.

Although the embodiments described and/or illustrated herein are described and/or illustrated with respect to a wind turbine, and more specifically controlling rotor speed of a wind turbine, practice of the embodiments described and/or illustrated herein is not limited to wind turbines. Rather, the embodiments described and/or illustrated herein are applicable to controlling a speed of any rotor having one or more blades. In addition, while the above has been described with respect to individual wind turbines, the disclosures are not so limited. The system and method disclosed may be utilized for a wind turbine plant and may include signals or instructions from a central plant control that input, adjust or otherwise control the acoustical profile and power profile to provide plant level control for noise generation and power generation. In one embodiment, the plant control provides a signal to the controller of one or more of the plurality of wind turbines corresponding to a desired or maximum allowable noise level. The controller alters the acoustical profile in response to the signal and new noise reduced operational conditions are determined and implemented in the individual wind turbines.

While the disclosure has been described with reference to a preferred embodiment, it will be understood by those skilled in the art that various adjustments may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method for controlling noise generated from a wind turbine having a blade attached to a hub having a rotor shaft, and a generator in communication with the rotor shaft, and the at least one blade having an adjustable pitch angle, the method comprising:
    providing a wind turbine acoustical profile, the wind turbine acoustical profile including a plurality of acoustical values;
    providing a wind turbine power profile;
    comparing the wind turbine acoustical profile and the wind turbine power profile to determine a noise reduced operational condition; and
    controlling the wind turbine to provide a rotor speed and the pitch angle of the blade corresponding to the noise reduced operational condition.

2. The method of claim 1, wherein controlling includes selectively adjusting the rotor speed and selectively adjusting the pitch angle of the blade to the desired power coefficient and amount of noise.

3. The method of claim 1, wherein the acoustical profile is calculated from predicted values of noise for a plurality of preselected pitch angles and rotor angular velocities.

4. The method of claim 1, wherein the plurality of acoustical values includes values of noise for preselected pitch angles and rotor angular velocities, the values being determined by analytical modeling.

5. The method of claim 1, wherein the wind turbine power profile includes values of power coefficient for a plurality of preselected pitch angles and rotor angular velocities, the power coefficient being defined as power extracted by the rotor divided by the amount of power in the wind.

6. The method of claim 1, wherein the plurality of acoustical values includes values of noise for a plurality of preselected pitch angles and rotor angular velocities, the values being estimated based upon input from sensors.

7. The method of claim 1, wherein the acoustical profile includes a desired noise level.

8. A wind turbine, comprising:
    at least one blade operably mounted on the wind turbine, the at least one blade attached to a hub having a rotor shaft, the rotor shaft in communication with a generator, the at least one blade having an adjustable pitch angle;
    the generator configured for converting torque into electrical power; and
    a controller capable of comparing a wind turbine acoustical profile and a wind turbine power profile to determine a noise reduced operational condition, the controller further being capable of controlling the wind turbine to provide a rotor speed and the pitch angle of the blade corresponding to the noise reduced operational condition, the wind turbine acoustical profile including a plurality of acoustical values.

9. The wind turbine of claim 8, wherein the controller selectively adjusts the rotor speed and selectively adjusts the pitch angle of the blade to maintain the desired power coefficient and amount of noise.

10. The wind turbine of claim 8, wherein the acoustical profile is calculated from predicted values of noise for a plurality of preselected pitch angles and rotor speeds.

11. The wind turbine of claim 8, wherein the plurality of acoustical values includes values of noise for preselected pitch angles and rotor speeds, the values being determined by analytical modeling.

12. The wind turbine of claim 8, wherein the wind turbine power profile includes values of power coefficient for a plurality of preselected pitch angles and rotor angular velocities, the power coefficient being defined as power extracted by the rotor divided by the amount of power in the wind.

13. The wind turbine of claim 8, wherein the plurality of acoustical values includes values of noise for a plurality of preselected pitch angles and rotor angular velocities, the values being estimated based upon input from sensors.

14. The wind turbine of claim 8, wherein the acoustical profile includes a desired noise level.

15. A wind turbine plant comprising:
    a plurality of wind turbines, at least one of the plurality of wind turbines comprising:
        at least one blade operably mounted on the wind turbine, the at least one blade attached to a hub having a rotor shaft, the rotor shaft in communication with a generator, the at least one blade having an adjustable pitch angle;
        the generator configured for converting torque into electrical power; and
    a controller capable of comparing a wind turbine acoustical profile and a wind turbine power profile to determine a noise reduced operational condition, the controller further being capable of controlling the wind turbine to provide a rotor speed and the pitch angle of the blade corresponding to the noise reduced operational condition, the wind turbine acoustical profile including a plurality of acoustical values.

16. The wind turbine plant of claim 15, wherein the controller selectively adjusts the rotor speed and selectively adjusts the pitch angle of the blade to maintain the desired power coefficient and amount of noise.

17. The wind turbine plant of claim 15, wherein the plurality of acoustical values includes values of noise for a plurality of preselected pitch angles and rotor angular velocities.

18. The wind turbine plant of claim 15, wherein the acoustical profile includes a desired noise level.

19. The wind turbine plant of claim 15, further comprising a plant control capable of providing a signal to the controller of one or more of the plurality of wind turbines corresponding to values of noise for a plurality of preselected pitch angles and rotor angular velocities.

20. The wind turbine plant of claim 15, further comprising a plant control capable of providing a signal to the controller of one or more of the plurality of wind turbines corresponding to a desired noise level.

* * * * *